(12) United States Patent
Dumortier et al.

(10) Patent No.: US 7,500,384 B2
(45) Date of Patent: Mar. 10, 2009

(54) METHOD FOR CONTROLLING THE SEALING OF A TANK ON AN AIRCRAFT

(75) Inventors: Laurent Dumortier, Targon (FR); Jacques Samenayre, Bordeaux (FR)

(73) Assignee: Aerowing, Nashville, TN (US)

( * ) Notice: Subject to any disclaimer, the term of this patent is extended or adjusted under 35 U.S.C. 154(b) by 167 days.

(21) Appl. No.: 10/559,478

(22) PCT Filed: Jun. 18, 2003

(86) PCT No.: PCT/FR03/01852

§ 371 (c)(1), (2), (4) Date: Dec. 19, 2006

(87) PCT Pub. No.: WO04/001364

PCT Pub. Date: Dec. 31, 2003

(65) Prior Publication Data
US 2007/0089491 A1    Apr. 26, 2007

(30) Foreign Application Priority Data
Jun. 19, 2002 (FR) .................................. 02 07554

(51) Int. Cl.
G01M 3/04 (2006.01)
(52) U.S. Cl. .................... 73/49.8; 73/40.7; 73/49.2
(58) Field of Classification Search ............. 73/40.7, 73/49.2, 49.3, 49.8
See application file for complete search history.

(56) References Cited

U.S. PATENT DOCUMENTS

| | | | |
|---|---|---|---|
| 3,572,096 A * | 3/1971 | Meyer | ................. 73/40.7 |
| 3,809,898 A | 5/1974 | Fries | |
| 4,745,797 A | 5/1988 | Wegrzyn | |
| 4,976,136 A | 12/1990 | Willan | |
| 5,117,876 A | 6/1992 | Kuntz | |
| 6,289,722 B1 | 9/2001 | Schellenberg | |

FOREIGN PATENT DOCUMENTS

GB    2 331 152    5/1999

* cited by examiner

*Primary Examiner*—Daniel S Larkin
(74) *Attorney, Agent, or Firm*—Waddey & Patterson, P.C.; Lucian Wayne Beavers

(57) ABSTRACT

In a process for controlling a tank of an aircraft in flight configuration, provided with at least one filling fitting and at least one purge fitting, a detection gas supply is connected to at least one of the purge or filling fittings. An adaptor for measuring pressure and/or controlling the concentration of detection gas to at least one of the purge fittings is connected when the supply is connected to one of the filling fittings or to one of the filling fittings when the supply is connected to one of the purge fittings. A detection gas under pressure is injected into the tank, and at the periphery of the tank the presence of detection gas from a possible leak is detected.

21 Claims, 4 Drawing Sheets

METHOD FOR CONTROLLING THE SEALING OF A TANK ON AN AIRCRAFT

Figure 1:
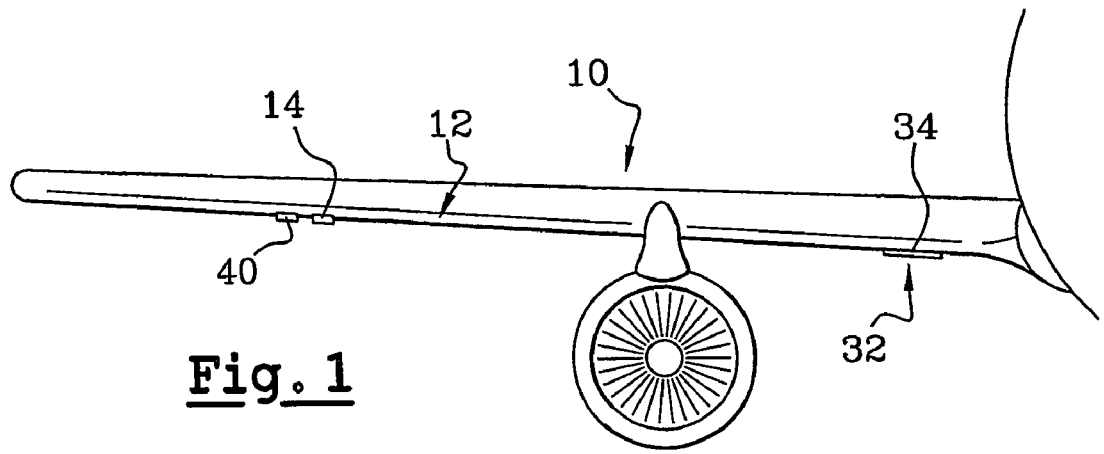

The present invention relates to a process for controlling the sealing of the tank of an aircraft and an associated device for these tanks.

It is known that aircraft tanks are principally integrated into the wings which themselves serve as containers.

Thus, the wings are constituted by structures which leave a very large closed internal volume. Strips of technical mastic ensure the sealing over all the lines of juncture between the covering plates of the structure to render the internal volume sealed.

These technical mastic cords permit resisting variations of temperature and above all offer elasticity which permits deformation of this structure when it is subjected to wind stresses.

The tanks thus constituted are generally provided with separators to provide independent compartments.

The filling or emptying of the tanks takes place by means of one or several filling attachments, to which are connected an adaptor called "connector or coupling", connected to the fuel supply network (cistern, tanks, . . . ). These filling couplings are standard and common to all types of aircraft. They are generally located on the lower surface of the air foils.

In aircraft, these tanks are provided with purges at lower points on each wing, one for each compartment when there are these. These purges are systematically valves which, when they are pressed, let flow the fluid contained in said tank. These purges have essentially as their application the flow of water of condensation accumulated in the tanks. The water being denser than the fuel, it accumulates at a lower point and this is what flows out first during purges. They serve also to drain the tanks when maintenance operations require opening the tanks to have access thereto.

Moreover, in the case of civil aircraft, these tanks are opened to ensure balancing of the internal pressures no matter what the altitude of the flight.

There is understood by civil aircraft, transport aircraft which use civil technology, no matter what the use, whether civil or military. There is understood by military aircraft, attack planes whose technology is purely military and whose requirements are specific.

This balancing of pressure is obtained by opening to free air through an outlet opening.

So as not to disturb the flow of air over the wing surfaces, the air intake is of the Naca type.

The control of the tanks is carried out in the case of detection of serious loss but also on the occasion of operations of programmed maintenance.

Thus, the arrangement with mastic cords is a very interesting technical solution but it gives rise to difficult detection of the origins of leaks. A flow seen in one location does not always lead to the presence of a leak in line with this location of visualization. The fuel can run along the structures without permitting easily locating the point of origin of the leak and hence of the defective cord.

A technique has been used to permit detecting precisely these leaks. It is a matter of a device which uses helium as detection or tracing gas and a probe of very high sensitivity capable of detecting several molecules of this gas. This gas is constituted inherently of molecules of very small size, which facilitates its circulation and its passage even through the smallest openings.

Moreover, it has a high tendency to spread over a given volume even if there is no forced circulation and it gives no risk of explosion or fire.

During operations of aircraft maintenance, the tanks are entirely emptied and ventilated, the aircraft is placed on jacks and all the other operations on the aircraft are carried out at the same time.

As to the tanks, the losses are detected by placing diaphragms over the external region supposed to be leaking. These bladders are sealed and form an injection chamber, connected to a source of helium. The latter diffuses through the possible leak and an operator, having entered the tank through a manhole, moves his detector along the joints of technical mastic to detect the exact place of penetration of the helium into the tank from the bladder, through the leak.

The mastic joint is taken off and a new joint is emplaced.

Once the tanks are repaired and the other operations carried out, the aircraft is returned to service as rapidly as possible because each unused day is very expensive to the operator.

The aircraft is thus returned to its wheels and filling with fuel is carried out.

But sometimes undetected leaks appear.

This situation is inadmissible because it leads necessarily to a prolongation of immobilization of the aircraft with serious financial consequences but also technical consequences. It is necessary again to empty the tanks, air them out and proceed as before to detect the residual leak.

All this handling of fuel leads to the institution of security precaution measures as to the risk of fire, and of explosion, but also of environmental pollution. Moreover, it is known that the fuel environment of the tanks is a medium favorable to the development of microorganisms on the mastics and hence to generate pollution of the fuel by rendering them unclean for aircraft consumption given the quality standards. The temporary withdrawal of the fuel is difficult. It is therefore necessary to use methods suitable for overall control of the tanks so that the aircraft will be certainly in conformity at the end of maintenance.

On the other hand, there is a problem very specific to aviation, namely of procedures. Thus, when the aircraft is in flight configuration, which is to say that no element or subassembly essential to its navigability is removed or missing, it is prohibited to disassemble certain elements, independently of the complete procedure. The disassembly of the manholes for example is possible only to carry out all the steps of the complete procedure which is necessarily difficult.

It would be desirable to have an integral technical control of the tanks, in flight configuration, before filling the tanks and before returning the aircraft to service, more particularly before refilling.

Moreover, as indicated above, no piece should be disassembled or replaced.

In the case of fighter craft, the tanks are pressurized, and the tanks are generally divided into several independent parts, which complicates the architecture but also the control.

Thus, the verification of leaks becomes much more complicated and the entry into the tanks is more difficult. If in this case the financial requirements are less crucial, the availability is necessary at the same time that the requirements of maintenance and detection of possible leaks are at least as important as in the case of civil aircraft.

Another requirement arises because the controls use gases such as helium. Even if helium in particular is a gas which can be provided at reasonable cost, the maintenance operations are regularly repeated and the tanks of certain aircraft are of large size, which leads to large consumption of these control gases.

There should thus be a procedure which permits reducing these consumptions whilst permitting satisfactory tests.

The present invention provides a process for control of an aircraft tank which permits testing said tank in flight configuration as well as an associated device for practicing this process.

Figure 3:
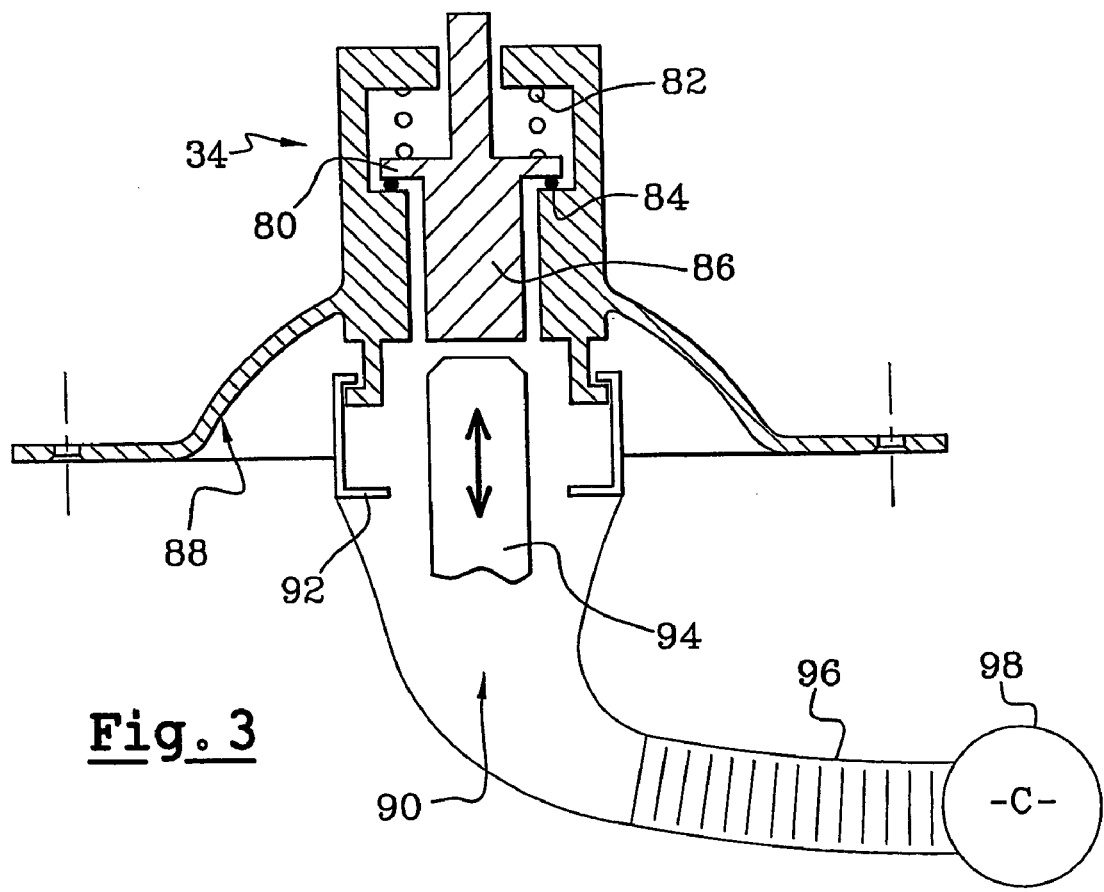
Figure 2:
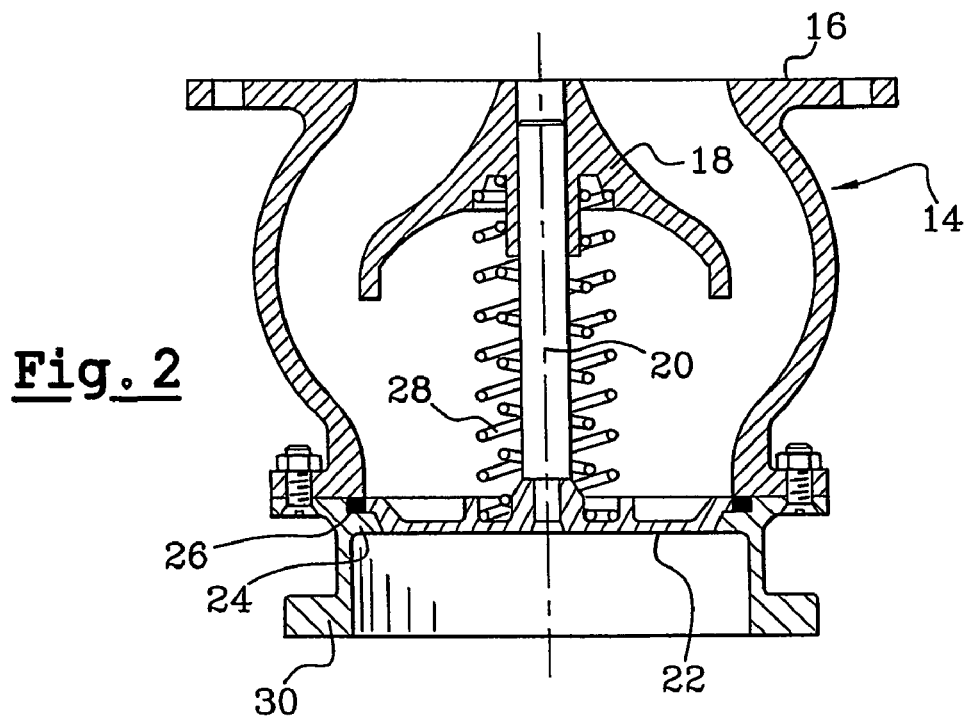
Figure 4:
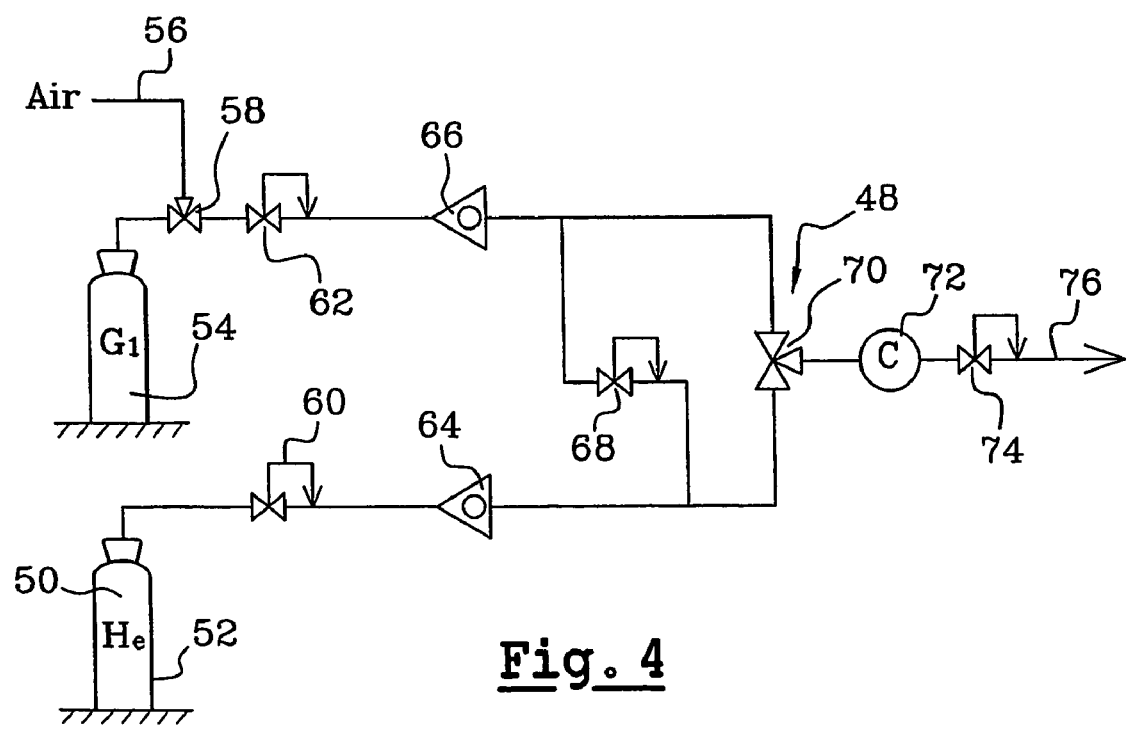
Figure 5:
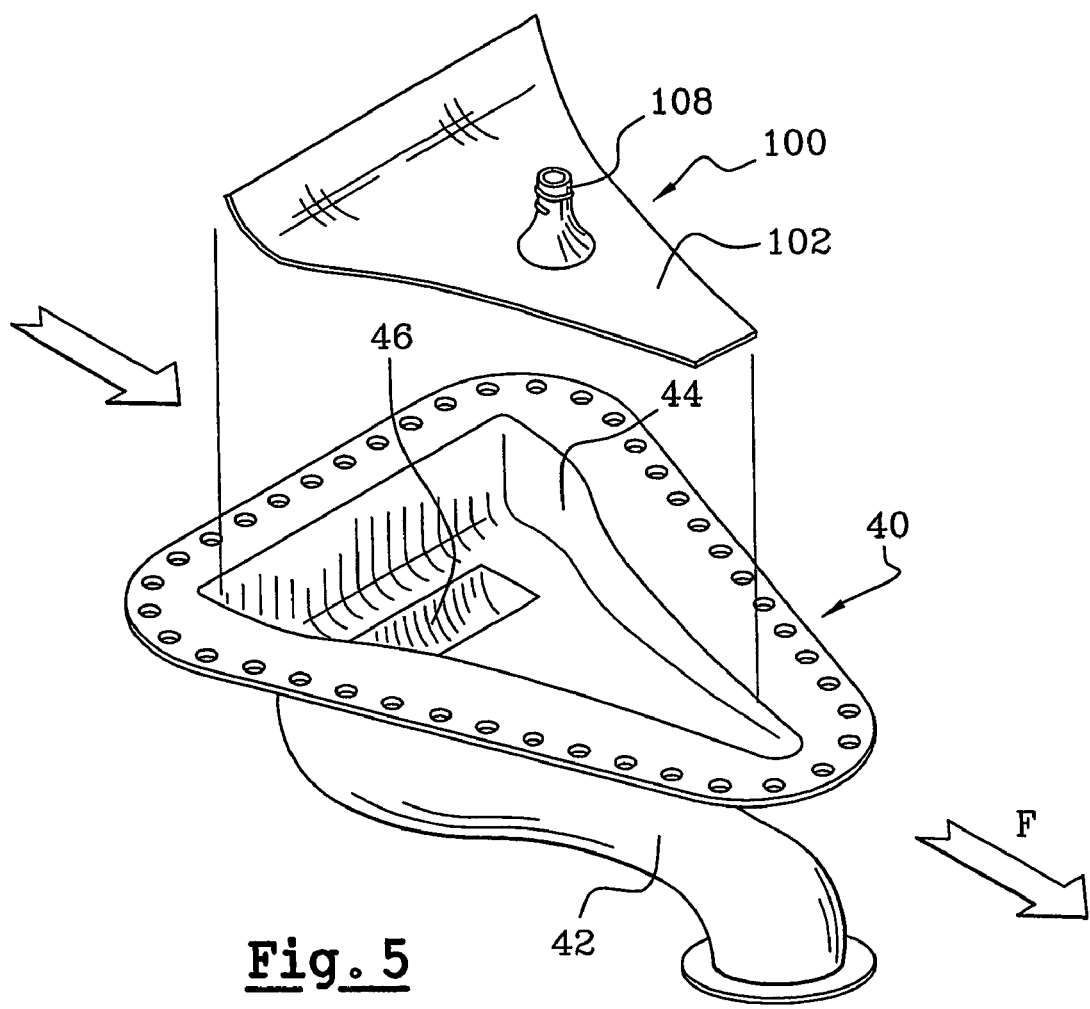
Figure 6A:
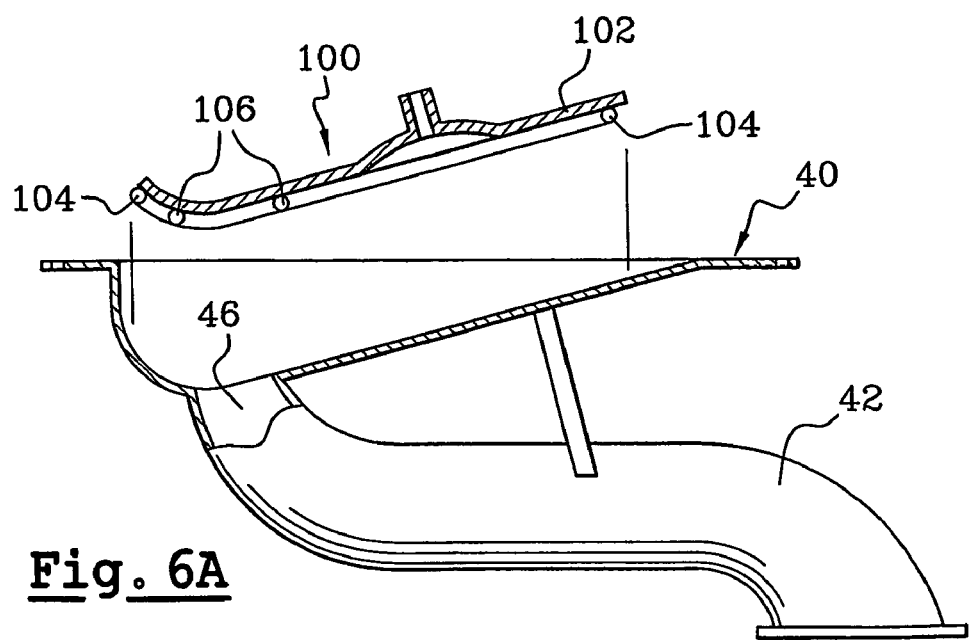
Figure 6B:
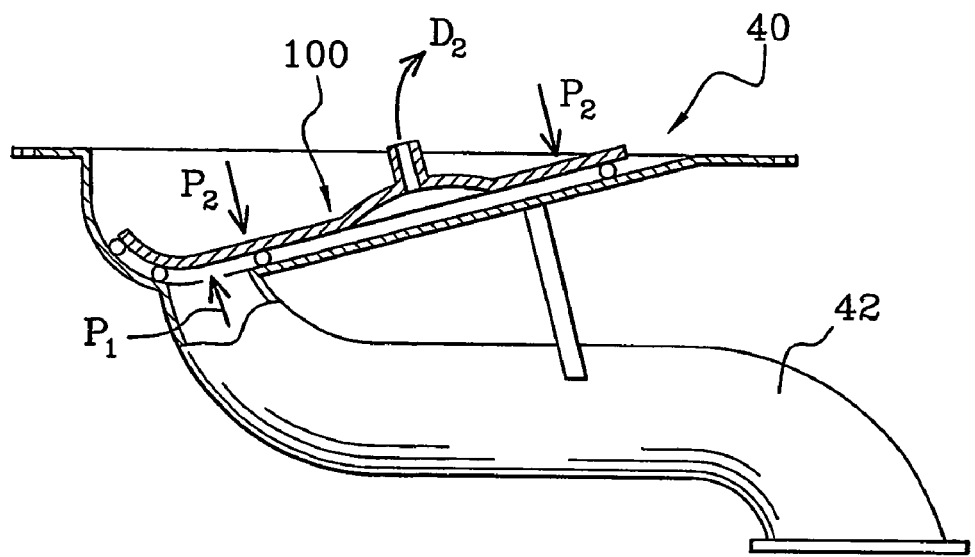
Figure 7:
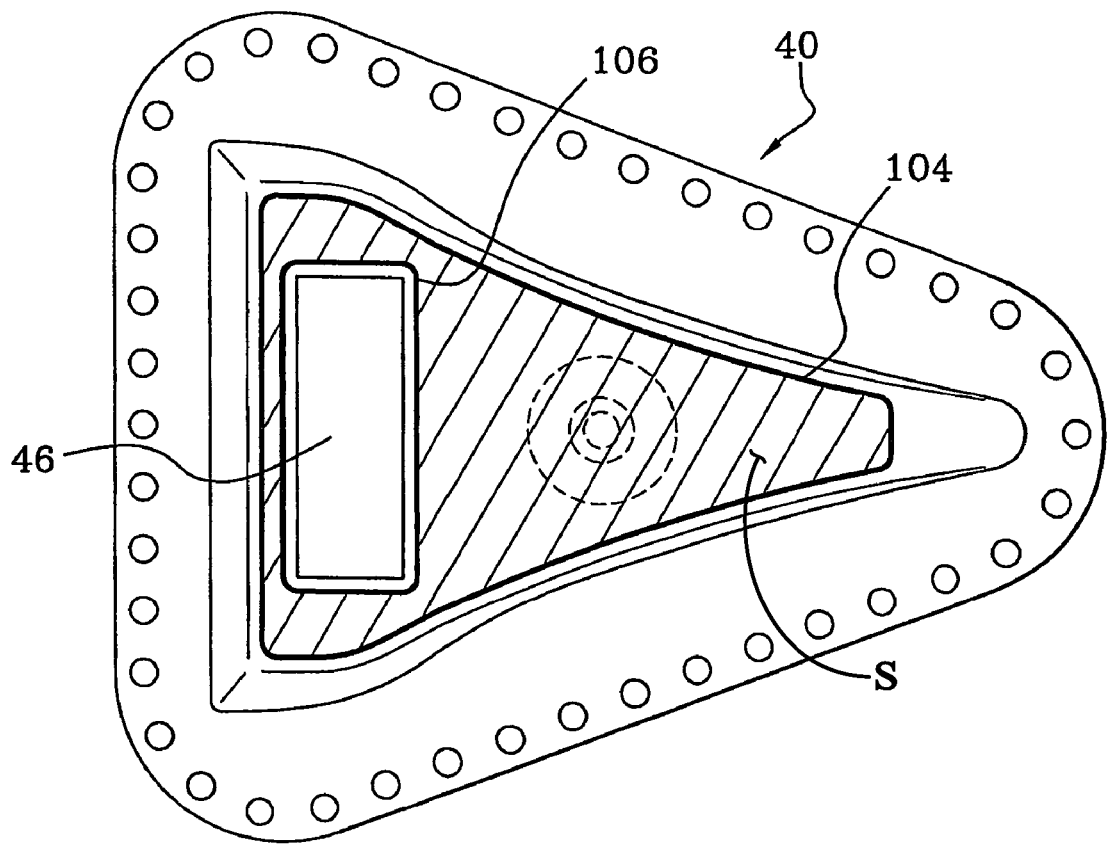

The invention will now be described in detail according to a particular embodiment, which is non-limiting, with respect to the drawings, which show:

FIG. 1, a schematic view of a wing in front elevation,

FIG. 2, a view of a filling attachment provided with its injection adaptor,

FIG. 3, a schematic view of a purge fitting provided with its instrumentation, FIG. 4, a schematic view of injection means, FIG. 5, a detailed perspective view of a Naca air intake as well as the device according to the present invention, FIGS. 6A and 6B, two medial cross-sectional views of the air intake of FIG. 5, with the front device and after emplacement, and FIG. 7, a top plan view of this same air intake.

An aircraft wing 10, in this case a civil aircraft, is used as the fuel tank 12 and for simplification of the description, it will be considered that the wing constitutes a single and only tank. Thus, in most aircraft, the fuel is distributed in different tanks for various reasons, particularly safety.

A filling fitting, of standard type, is also present on the wings in communication with the interior of the wing so as to fill with fuel the tank 12 which is thus constituted.

This filling fitting is shown in detail in FIG. 2, according to a standard embodiment. It comprises a body 14, secured to the tank by its interface 16, by means of suitable sealing joints, this in known fashion.

An internal hub in a centered position ensures the guidance of the rod 20 of a valve 22 that is movable in translation.

This valve is of truncated conical shape and bears against a seat 24 provided with a sealing joint 26.

A spring 28 presses this valve continuously against the joint to ensure sealed closure.

This filling fitting comprises moreover a coupling collar 30, of the pump connection type, provided to receive a filling fitting secured to a fuel supply hose.

At at least a lower point 32, there is provided a purge fitting 34 of the tank. This purge fitting, FIG. 3, comprises in known fashion a valve and a rod adapted to permit manipulating the valve to permit flow of fluid through this valve. The operators can thus regularly evacuate the water which is generally present from phenomena of condensation connected to the variations in temperature. The air entering the tank in place of the consumed fuel has a certain quantity of moisture. The contained water condenses in the course of certain stages of the flight, particularly during phases of change of altitude which gives rise to variations in temperature.

An air inlet 40 of the Naca type, shown in FIG. 5 in particular, is installed on the wing with a conduit 42 also in communication with the interior of the tank to place the interior of this tank permanently in equi-balance with the exterior, it being remembered that this is a civil aircraft.

This air intake comprises a recess 44 of substantially triangular shape in the plane of the wing and also in a perpendicular plane. At the bottom of the recess, adjacent the greatest depth and greatest length, there is provided an opening 46.

This opening is connected by the conduit 42 to the tank to place the internal volume in communication with the outside.

This air intake is well known and widely used on aircraft because it avoids giving rise to disturbances of the air flow circulating over the wings. This air intake preserves laminar flow without creating turbulence.

What is generally an aerodynamic improvement for other bodies in motion becomes an aeronautical necessity.

Once the tank is in flight configuration, there is an internal volume of the empty tank to be controlled with three access points:

the fuel filling intake 14, the purge fitting 34, and the Naca air intake opening 40.

The process of detecting a leak in an empty tank according to the invention consists in placing said tank under pressure with the help of a detection gas, in this case helium. This necessary overpressure $\underline{P1}$ is very small, of the order of 0.10 to 0.15 bar.

On the other hand, the helium is to be injected in a sufficient quantity to reach preferably all points in the tank at a concentration of 10 to 20 ppm, namely of the order of 5% helium relative to the air.

However, there is a problem which is that of the diffusion of the helium in the tank, because even if this gas has a good power of diffusion, the different membranes, reinforcements, passages through the structure are obstacles which slow diffusion.

The injection pressure of the detection gas is between 0.5 bar and 3 bars, as a function of the type of aircraft tested.

To inject this gas, there are used specific injection means 48, having a mixing function. These means comprise a source 50 of detection gas, in this case helium He, generally distributed in bottle 52 and a source 54 of vector gas, for example a neutral gas less costly such as nitrogen dioxide $NO_2$ to provide an inert character, or air 56 from a compressed air network of the maintenance hall. In this case, a three-way valve 58 permits changing the source or to provide a mixture of the two.

Expanders 60, 62 permit adjusting with precision the outlet pressure of gas whilst flow valves 64, 66 permit adjustment of the dispensed volume.

There is provided a balance of the pressures in 68 whilst a three-way valve 70 ensures the distribution to a point through a catharometer 72. A second safety electrovalve 74 permits adjusting with precision the injection pressure of the mixture. This mixture is then distributed through an outlet conduit 76.

The detector used by the operator during these controls of traces of detection gas, helium in the case in point, is preferably that called "HELITEST", sold by the "VARIAN S.P.A." company.

Such a detector has sensitivity such that it detects a concentration of 2 ppm of helium.

To inject the detection gas into the tank, the supply is connected to one of the two access points, in the present case, it is the filling fitting 14 which is used.

The outlet conduit 76 of the mixture is provided with a supply fitting suitable for connection to the coupling collar 30 of the filling fitting.

So as to be able to measure the concentration of helium in the tank and thus to achieve a minimum threshold, it is necessary to provide a removal point distant from the point of injection which constitutes the filling fitting 14.

The purge fitting 34 is thus used for this purpose because it is in place permanently and it does not require any opening or modification of the aircraft in flight configuration. This fitting is regularly used during phases of refilling with fuel.

To this end, an adaptor is placed on the purge fitting 34.

This adaptor forms a portion of the device according to the present invention.

A schematic of this adaptor is shown in FIG. 3, in simplified manner, so as to present the functions of the different elements.

There should be provided a standard adaptor that can be mounted on each type or purge, this adaptor being able at least to fulfill the functions indicated hereafter.

The purge fitting 34 comprises a valve 80 subject to the action of a return element 82 such as a spring. The valve 80 comprises a joint 84 which ensures sealing when the valve is subject to this return force.

A plunger 86 secured to the valve is accessible from the outside, in a recess 88. By exerting force on this plunger, the valve 80 is raised, against the return element 82, and said valve is opened.

The adaptor 90 comprises means 92 for securing to the existing purge fitting 34, means 94 for manipulating the opening of the valve 80, a conduit 96 connected to a catharometer 98 for measuring the concentration in helium.

It will be noted that the purge fitting 34 does not require any modification, only the adaptor is provided to be able to perform the desired function.

As will be described later during the description of the operation, the tank is subjected to pressure and this pressure is verified in a certain manner to avoid any increase that might damage the structures.

To measure the pressure increase in the tank, it is necessary to have access thereto. The purge fitting could also be used for this purpose but in the embodiment at hand, it is by the third access point that this measurement is carried out, namely, the air intake 40 of the Naca type.

In all these manners, as the interior of the wing must be placed under slight pressure, it is necessary to close this air intake.

These closure means 100 are shown in detail in FIGS. 6A and 6B. These means comprise a plate 102 of a shape complementary to that of the bottom of the air intake of the Naca air intake.

This plate has two joints 104 and 106. The first peripheral joint 104, shown in FIG. 7, follows substantially the external shape of the bottom of this Naca air intake.

As to the second joint 106, it follows the contour of the opening 46 located in the bottom of the air intake.

Thus between the two joints, a surface S is defined.

An outlet 108 permits connecting in line with this surface S.

This outlet receives a connector to a source of vacuum. Such a source can be a venturi connected to the available source of industrial compressed air.

This vacuum source generates an underpressure D2.

This underpressure D2 multiplied by the surface S on which it acts, leads to a resultant force P2 which tends to press the plate against the bottom of the air intake.

The underpressure D2 thus created must be of the order of 0.7 to 0.8 bar at a maximum.

On the other hand, the pressure of the detection gas, the helium, gives rise on the cross-section of the opening 46, to a resultant force P1.

The resultant force P1 should be less than the force P2 so that the plate remains in place and closes the air intake when the plate is pressed manually against the bottom of the Naca air intake, as shown in FIG. 6B.

This arrangement permits closing the air intake without recourse to disassembly or modification of the pieces in place. It is known that when the aircraft is in flight configuration, it is not possible to intervene.

The closure of the Naca air intake also permits providing an outlet for the measurement of gas pressure in the tank. This measurement permits providing a manual reading with the help of a manometer to have a second source of verification.

According to an improvement, this second measurement can also permit controlling the automatic filling means, when this option is used.

The use of the arrangement according to the present invention will now be described.

The injection means are placed in service and an injection pressure is programmed as well as a concentration of helium. The detection means and measurement means are connected to the purge fitting and the plate is emplaced in the air intake manually.

The source of vacuum is actuated and said plate is pressed into the bottom of the air intake.

The manometer is in service.

The injection means are controlled to inject the gaseous mixture.

The quantity of helium injected in the mixture is of the order of 10% and when the catharometer at the purge point indicates a concentration of 5%, the injection is stopped.

Thus, this is to say that the concentration is comprised between 5 and 10% or more, which permits refining the measurements and economizing on detection gas.

Thus, if 100% helium gas is injected, given the diffused retarded by obstacles, when the measurement at the purge point registers 5%, the operator will have a sharp gradient between the injection point of 100% and the measurement point of 5%, which can give rise to disparities of detection as well as excessive consumption of gas.

Because of this, the tank can be held under slight pressure before filling for a final determinative control.

It then suffices for the operator to move the helium detector over all the surface in question of the wing forming a tank.

If a tank leak lets helium escape, even in very small quantity, it is possible to detect and thus proceed to interventions judged necessary before the aircraft leaves the maintenance site and is not yet returned to service.

This operation can be carried out moreover during the maintenance cycle of the aircraft, thereby avoiding almost certainly the risk of prolongation of immobilization because of fuel leaks.

It will be noted that at these three points of access, the roles of the different points could be carried out: the injection of detector gas at the purge point, the control of pressure in line with the filling fitting and the detection of concentration of detection gas in line with the air intake.

In the case of a military aircraft, the tanks are free from Naca air intakes because the tanks are under pressure during flight. It is thus necessary that they constitute closed chambers so that the problem of obstruction of the air intakes no longer arises.

On the other hand, these tanks comprise purge fittings having the same operations as well as filling fittings.

Moreover, the tanks are maintained at different pressures as a function of their positions in the wings. The farther the tank in question is from the fuselage and hence from the motors, the greater the operating pressure. During control of the sealing of the tanks, it is thus necessary to be able to carry out tests with pressurization at least equal to the nominal pressure of operation.

The operation is thus identical with an adaptation of the detection gas pressure which must be adjusted to the reference value associated with the tank in question.

The problem of diffusion of the gas in each tank is more crucial because the obstacles are even more numerous in this type of military aircraft than in civil aircraft. Moreover, the requirement of the volumes is also a constraint.

Detection once the tank is pressurized with the detection gas, the control takes place in the same manner as before.

The invention claimed is:

1. A process for control of a tank of an aircraft in flight configuration, provided with at least one filling fitting and at least one purge fitting, said process including the steps of:
   connecting a detection gas supply to at least one of the purge or filling fittings;
   connecting an adaptor for the measurement of pressure and/or the control of the concentration of detection gas to at least one of the purge fittings when the supply is connected to one of the filling fittings or to one of the filling fittings when the supply is connected to one of the purge fittings;
   injecting into the tank a detection gas under pressure P1; and
   detecting at the periphery of the tank the presence of detection gas from a possible leak.

2. The process for control of a tank according to claim 1, wherein the injecting step comprises injecting a mixture of the detection gas and at least one vector gas.

3. The process for the control of a tank according to claim 1, wherein in the presence of air intakes for balancing pressures associated with said tank, each air intake is closed for balancing pressures by means of a closure device with underpressure D2.

4. The process for the control of a tank according to claim 3, wherein the underpressure D2 is maintained such that multiplied by a cross-section S over which underpressure D2 acts, underpressure D2 generates a force P2 greater than the resultant force of the pressure P1 of the detection gas, multiplied by a cross-section of an opening of the air intake over which pressure P1 acts.

5. The process for the control of a tank according to claim 1, wherein helium is used as the detection gas.

6. The process for control of a tank according to claim 1, further comprising:
   measuring pressure within the tank during the injecting and detecting steps.

7. A process for leak testing of a tank of an aircraft having at least first and second access fittings, comprising:
   connecting a detection gas supply to the first access fitting;
   connecting an adaptor for the measurement of concentration of detection gas to the second access fitting;
   injecting from the detection gas supply into the tank a detection gas under pressure; and
   detecting at an exterior of the tank the presence of detection gas from a possible leak.

8. The process of claim 7, wherein one of the first and second access fittings is a filling fitting and the other of the first and second access fittings is a purge fitting.

9. The process of claim 7, wherein the first and second access fittings are selected from the group consisting of filling fittings, purge fittings and air intakes.

10. The process of claim 7, further comprising:
    measuring pressure within the tank during the injecting and detecting steps.

11. The process of claim 7, wherein:
    the injecting step comprises injecting a mixture of the detection gas and at least one vector gas.

12. The process of claim 7, wherein the tank includes an air intake, and the process further comprises:
    closing the air intake with a closure plate; and
    holding the closure plate in place on the air intake by creating a pressure differential across the closure plate.

13. The process of claim 7, wherein the detection gas comprises helium.

14. An apparatus for leak testing of a tank of an aircraft, the tank including at least first and second tank access points providing communication with an interior of the tank, the apparatus comprising:
    an injector assembly for injecting a mixture of detection gas and vector gas into the tank, the injector assembly including:
      a first conduit for communicating with a source of detection gas;
      a second conduit for communicating with a source of vector gas;
      a mixing device connected to the first and second conduits;
      a first connector for connecting to the first tank access point; and
      a third conduit for communicating the mixing device with the first connector; and
    an adaptor assembly for measuring a detection gas concentration in the tank, the adaptor assembly including:
      a detection gas concentration measuring device;
      a second connector for connecting to the second tank access point; and
      a fourth conduit for communicating the measuring device with the second connector.

15. The apparatus of claim 14, wherein:
    one of the first and second connectors is constructed to connect to a filling fitting and the other of the first and second connectors is constructed to connect to a purge fitting.

16. The apparatus of claim 14, wherein the first and second connectors are constructed to connect to tank access points selected from the group consisting of filling fittings, purge fittings and air intakes.

17. The apparatus of claim 14, further comprising:
    a pressure sensor for measuring pressure within the tank during injection of detection gas and vector gas into the tank.

18. The apparatus of claim 17, wherein the pressure sensor is included in the injector assembly.

19. The apparatus of claim 17, wherein the pressure sensor is included in the adaptor assembly.

20. The apparatus of claim 17, wherein the pressure sensor is connected to a third tank access point.

21. The apparatus of claim 14, further comprising:
    a closure plate shaped to match a shape of an air intake recess of the tank and to cover an air intake opening of the tank, a first joint for sealing the closure plate around the intake opening of the tank, a second joint for sealing the closure plate to the air intake recess of the tank so that a surface is defined on the closure plate between the first and second joints, and an outlet defined through the closure plate for communicating a vacuum source with the surface.

* * * * *